(12) United States Patent
Kim et al.

(10) Patent No.: US 7,921,674 B2
(45) Date of Patent: Apr. 12, 2011

(54) METHOD OF MANUFACTURING OPTICAL WAVEGUIDE USING OPTICAL SOLITON

(75) Inventors: Hong Ki Kim, Gyunggi-Do (KR); Bae Kyun Kim, Gyunggi-Do (KR); June Sik Park, Gyunggi-Do (KR); Dong Hoon Kang, Gyunggi-Do (KR); Sang Su Hong, Gyunggi-Do (KR); Chang Yun Lee, Gyunggi-Do (KR); Tak Gyum Kim, Gyunggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 577 days.

(21) Appl. No.: 12/062,165

(22) Filed: Apr. 3, 2008

(65) Prior Publication Data
US 2008/0245108 A1    Oct. 9, 2008

(30) Foreign Application Priority Data

Apr. 4, 2007  (KR) .................. 10-2007-0033361

(51) Int. Cl.
*C03C 23/00* (2006.01)
(52) U.S. Cl. ............... 65/377; 65/392; 65/386; 65/378; 430/321; 430/395; 250/492.1
(58) Field of Classification Search ............ 65/377, 65/392, 386, 378; 430/321, 395; 250/492.1
See application file for complete search history.

(56) References Cited

U.S. PATENT DOCUMENTS

| | | | | |
|---|---|---|---|---|
| 4,410,277 A | * | 10/1983 | Yamamoto et al. | 356/366 |
| 4,974,943 A | * | 12/1990 | Noguchi | 359/305 |
| 5,469,525 A | * | 11/1995 | Luther-Davies et al. | 385/122 |
| 5,999,309 A | * | 12/1999 | Jang | 359/337.21 |
| 6,870,970 B2 | * | 3/2005 | Leonard et al. | 385/5 |
| 6,977,137 B2 | | 12/2005 | Borrelli et al. | |
| 2004/0047578 A1 | | 3/2004 | Fukuda et al. | |

FOREIGN PATENT DOCUMENTS

| EP | 1116965 A1 | 7/2001 |
|---|---|---|
| JP | 2005-292382 A | 10/2005 |
| WO | 96/41221 A1 | 12/1996 |

OTHER PUBLICATIONS

Miura K et al., "Photowritten optical waveguides in various glasses with ultrashort pulse laser" Applied Physics Letters, AIP, American Institute of Physics, Melville, NY, vol. 71, No. 23, Dec. 8, 1997, pp. 3329-3331, XP012019205 ISSN: 0003-6951.

(Continued)

*Primary Examiner* — John Hoffmann
(74) *Attorney, Agent, or Firm* — Lowe, Hauptman, Ham & Berner, LLP

(57) ABSTRACT

There is provided a method of manufacturing an optical waveguide, the method including: allowing a beam to be incident in an optical waveguide direction of an optical waveguide material; generating an optical soliton in the optical waveguide material by adjusting intensity of the incident beam according to the optical waveguide material; allowing the incident beam to be re-incident at an intensity higher than an intensity of the incident beam after checking generation of the optical soliton in the optical waveguide material; and increasing a refractive index of an optical soliton-generating area of the optical waveguide material by the re-incident beam to thereby form an optical waveguide.

9 Claims, 3 Drawing Sheets

OTHER PUBLICATIONS

Aitchison J S et al: "Observation of spatial optical solutions in a nonlinear glass waveguide" Optics Letters, OSA, Optical Society of America, Washington, DC, US, vol. 15, No. 9, May 1, 1990 pp. 471-473, XP000126535 ISSN: 0146-9592.

Schaffer C B et al: "Micromachining optical waveguides in bulk glass using a femtosecond laser oscillator" Conference on Lasers and Electro-Optics. (CLEO 2000). Technical Digest. Postconference Edition. San Francisco, CA, May 7-12, 2000 [Trends in Optics and Photonics. (TOPS)], New York, NY: IEEE, US, vol. 39, May 7, 2000, pp. 375-376, XP002231512 ISBN: 978-0-7803-5990-1.

Naumov A Y et al: "Microstructing with femtosecond laser inside silica galsses" Summaries of Papers Presented at the Conference on Lasers and Electro-Optics. CLEO 99. Technical Digest. Postconference Edition. Baltimore, MD, May 23-28, 1999; [Conference on Lasers and Electro-Optics], New York, NY: IEEE, US, May 23, 1999, pp. 356-357, XP002231516 ISBN: 978-0-7803-5658-0.

European Search Report issued on Dec. 5, 2008.

* cited by examiner

METHOD OF MANUFACTURING OPTICAL WAVEGUIDE USING OPTICAL SOLITON

CROSS-REFERENCE TO RELATED APPLICATIONS

This application claims the priority of Korean Patent Application No. 2007-33361 filed on Apr. 4, 2007, in the Korean Intellectual Property Office, the disclosure of which is incorporated herein by reference.

BACKGROUND OF THE INVENTION

1. Field of the Invention

The present invention relates to a method of manufacturing an optical waveguide, and more particularly, to a method of manufacturing an optical waveguide using an optical soliton generated in an optical waveguide material.

2. Description of the Related Art

An optical waveguide or optical fiber is an optical member transmitting a beam in one direction without being diffracted when the beam propagates through a material. The most common example for the optical waveguide is an optical fiber used in optical communication. This optical waveguide is one of essential parts in the modern information society. Particularly, in the optical telecommunication area, the optical waveguide technology is considered to determine capability of an overall system, thereby gaining increasing importance.

The optical waveguide utilizes total reflection characteristics in which a beam, when propagating from a high-refractivity material to a low-refractivity material, is not transmitted but totally reflected at a critical angle or more. In a conventional method of manufacturing the optical waveguide, ions such as Ge and Ti are diffracted in a waveguide material such as glass and $LiNbO_3$ to locally increase refractivity and guide the beam.

However, in this method, the Ge or Ti ions added are not diffracted deeply, thereby forming an optical waveguide only on a surface of the optical waveguide material and complicating a manufacturing process.

SUMMARY OF THE INVENTION

An aspect of the present invention provides a method of manufacturing an optical waveguide, capable of forming an optical waveguide easily using an optical soliton generated in a non-linear material.

According to an aspect of the present invention, there is provided a method of manufacturing an optical waveguide, the method including: allowing a beam to be incident in an optical waveguide direction of an optical waveguide material; generating an optical soliton in the optical waveguide material by adjusting intensity of the incident beam according to the optical waveguide material; allowing the incident beam to be re-incident at an intensity higher than an intensity of the incident beam after checking generation of the optical soliton in the optical waveguide material; and increasing a refractive index of an optical soliton-generating area of the optical waveguide material by the re-incident beam to thereby form an optical waveguide.

The allowing a beam to be incident on an optical waveguide material in an optical waveguide direction may include: focusing the beam of a femto-second laser by a lens and allowing the beam to be incident in an optical waveguide direction of an optical waveguide material, the femto-second laser spaced apart from the optical waveguide material and the lens disposed between the optical waveguide material and the femto-second laser.

The optical waveguide material may be formed of a glass material selected from a group consisting of $LiNbO_3$, $LiTaO_3$, KTP, AlGaAs, ZnSe, $Al_2O_3$ and $SiO_2$.

The generating optical soliton in the optical waveguide material may include adjusting intensity of the incident beam according to non-linear characteristics (optical kerr effects) of the optical waveguide material.

The optical waveguide material may be formed of the $SiO_2$ glass material and the incident beam for generating the optical soliton has an intensity of $10^{11}$ to $10^{12}$ W/cm$^2$.

The allowing a beam to be incident in an optical waveguide direction, the generating optical soliton in the optical waveguide material, the increasing intensity of the incident beam for generating the optical soliton, and the increasing a refractive index of an optical soliton-generating area of the optical waveguide material by the re-incident beam may be performed repeatedly, whereby the plurality of optical waveguides are formed in the optical waveguide material.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
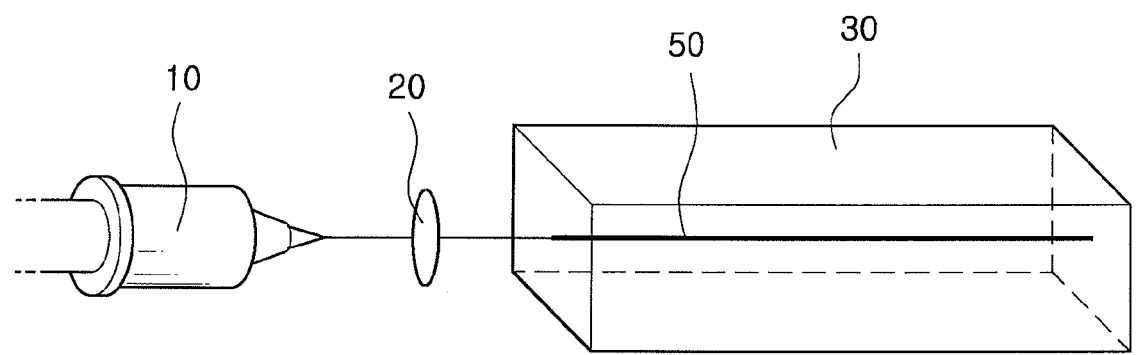
FIG. 1 is a configuration view for explaining a method of manufacturing an optical waveguide using an optical soliton according to an exemplary embodiment of the invention.

FIG. 1 is a configuration view for explaining a method of manufacturing an optical waveguide using an optical soliton according to an exemplary embodiment of the invention.

As shown in FIG. 1, in manufacturing the optical waveguide using the optical soliton according to the present embodiment, the optical soliton is generated in an optical waveguide material 30 using, for example, a femto-second laser 10 and a lens 20. Then, the generated optical soliton is utilized to a manufacture optical waveguide 50.

In the method of manufacturing the optical waveguide using the optical soliton according to the present embodiment, the plurality of optical waveguides 50 may be manufactured in the optical waveguide material via the femto-second laser 10 and the lens 20. Here, the femto-second laser 10 allows a beam to be incident in an optical waveguide direction of the optical waveguide material 30 prepared for manufacturing the optical waveguide and made of a glass material, for example, $LiNbO_3$, LiTaO3, KTP, AlGaAs, ZnSe, $Al_2O_3$, and $SiO_2$. Also, the lens 20 is disposed at one side of an incident surface of the optical waveguide material 30 to focus the beam generated by the femto-second laser 10.

First, a description will be given of the optical soliton employed in manufacturing the optical waveguide according to the present embodiment.

Figure 2A:
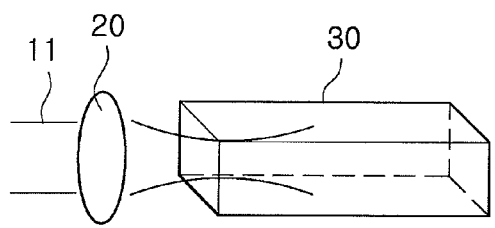
FIGS. 2A and 2B are configuration views for explaining a method of manufacturing an optical waveguide according to an exemplary embodiment of the invention.

In general, a beam is diffracted when propagating through a vacuum or a material. Even a laser beam is necessarily diffracted when traveling a long distance or focused by a lens. As shown in FIG. 2A, when the beam generated from the femto-second laser 10 is focused by the lens 20 and made incident on the optical waveguide material 30, the beam is naturally re-diffracted in the optical waveguide material 30, which is a non-linear material.

Figure 2B:
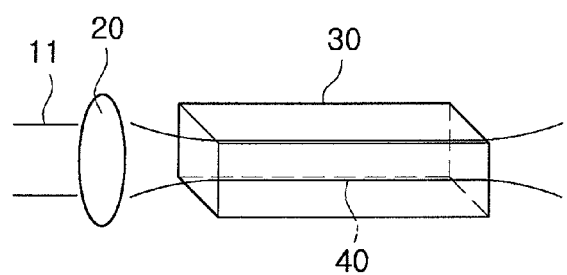
Figure 3:
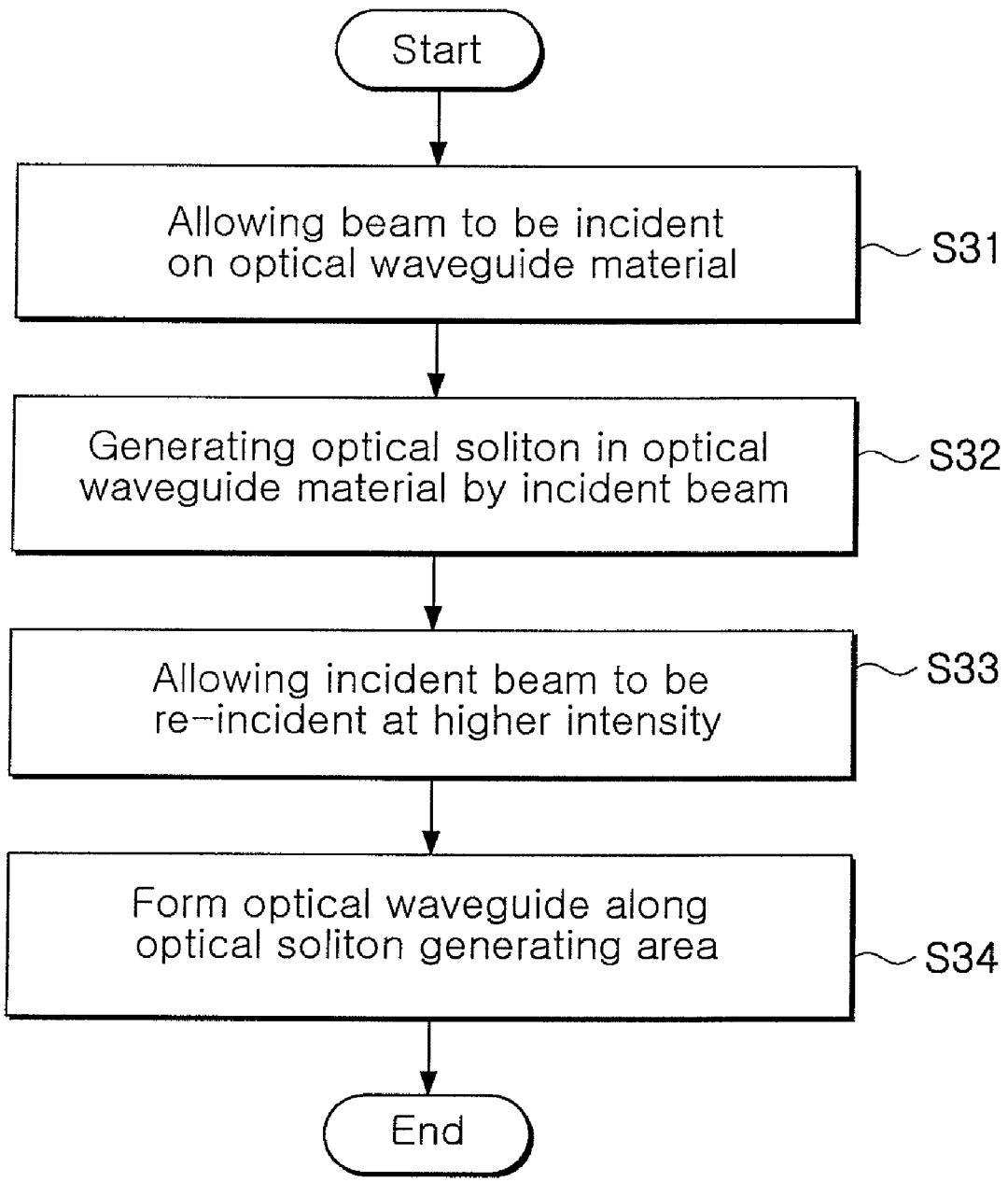
FIG. 3 is a flow chart illustrating a method of manufacturing an optical waveguide using an optical soliton according to an exemplary embodiment of the invention.

However, the beam may maintain its original optical size without being diffracted when traveling through a material, which is referred to as an optical spatial soliton. Specifically, as shown in FIG. 2B, the beam focused by the lens 20 propagates through the material 30, with the focused size maintained, without being diffracted any more in the non-linear optical waveguide material 30, under following mechanism.

The beam generated from the femto-second laser 10 shown in FIG. 1 generally has a Gaussian distribution. That is, the beam has a strong intensity in a central portion and a weaker intensity toward an outer periphery. This beam, when incident on the non-linear optical wave guide material 30, is greatly changed in refractive index in the central portion with a strong intensity and less changed in refractive index toward the outer periphery due to optical kerr effects caused by tertiary non-linearity of the material 30.

Therefore, the beam experiences an effect as in the lens, i.e. a self-focusing phenomenon. This self-focusing phenomenon, and diffraction, which is the unique characteristic of a beam, may be balanced, thereby generating the soliton 40 in which the beam no longer is diffracted or focused, as shown in FIG. 2B.

As a method to manufacture the optical waveguide using such an optical soliton, first, to generate the optical soliton 40, a beam of the femto-second laser 10 is focused by the lens 20 in an optical waveguide direction of the optical waveguide material 30, i.e., in a length direction of the optical waveguide material 30 and made incident on the optical waveguide material 30 in S31.

Then the incident beam of the femto-second laser 10 is adjusted in intensity to be made re-incident so that a spatial soliton is generated in the optical waveguide material 30 by the incident beam of the femto-second laser 10 as in S32.

Conditions for generating the optical soliton in the optical waveguide material 30 are determined by non-linear characteristics of the optical waveguide material 30 and intensity of a beam of the femto-second laser 10. For example, in a case where the optical waveguide material 30 is a $SiO_2$ glass material, a beam having an intensity of $10^{11}$ to $10^{12}$ W/cm$^2$ should be incident from the femto-second laser 10 to generate the soliton in the optical waveguide material 30.

Specifically, conditions for generating the spatial soliton are determined as follows. To begin with, E(r,t) pertaining to the incident beam and $P_{NL}$ representing non-linear characteristics in the following relations are inputted to Maxwell's wave Equation 1 and then nonlinear schrodinger equation is derived as in Equation 2.

$$E(r, t) = \frac{1}{2}U(r, z)e^{i(kz-\omega t)}$$

$$P_{NL} = P^{(3)}(r, t) = \frac{3}{4}\varepsilon_0 \chi^{(3)}|U|^2 U e^{ikz}$$

where E is an electric field, U is an electric field amplitude, r is a location, t is a time, $m_0$ is a permeability of the vacuum, e is a dielectric constant of material, $e_0$ is a permittivity of a vacuum, $P_{NL}$ is a function of non-linear polarization, $\chi^{(3)}$ is a third order susceptibility, and k is a wave vector.

$$\nabla^2 E(r, t) - \mu_0 \varepsilon \frac{\partial^2}{\partial t^2} E(r, t) = \mu_0 \frac{\partial^2 P_{NL}(r, t)}{\partial t^2} \quad \text{Equation 1}$$

$$\frac{\partial U}{\partial z} = \frac{i}{4}\frac{\partial^2 U}{\partial x^2} + i\frac{z_0}{z_{NL}}|U|^2 U \quad \text{Equation 2}$$

$$z_0 = \frac{\pi n w_0^2}{\lambda_0}$$

$$z_{NL} = \frac{8n}{3\chi^{(3)}|U|^2 k_0}$$

$$\frac{3}{8n}\chi^{(3)}|U|^2 = n_2 I$$

Equation 2 satisfies above relations and thus can be derived into Equation 3 as follows.

$$U = sech(\sqrt{2a}\, x)e^{i\frac{\sigma}{2}z} \quad \text{Equation 3}$$

$$a = \frac{z_0}{z_{NL}}$$

That is, the solition travels in the form of a Sech function in the optical waveguide material 30.

Also, in a case where the optical waveguide material 30 is formed of, for example, a non-linear material such as a fused silica satisfying $n_2=2.6\times10^{-16}$ cm$^2$/W, the incident beam for generating the optical soliton has an intensity ranging from $10^{11}$ to $10^{12}$ W/cm$^2$.

As described above, with the optical soliton generated in the optical waveguide material 30, the beam of the femto-second laser 10 has an intensity increased over the beam for generating the solition as in S33 to be made re-incident.

Specifically, with the solition generated in the optical waveguide material 30, the beam from the femto-second laser 10 has an intensity increased over the beam for generating the optical soliton, which has an intensity ranging from $10^{11}$ to $10^{12}$ W/cm$^2$. For example, the beam from the femto-second laser 10 is made incident at an intensity of $10^{13}$ to $10^{15}$ W/cm$^2$, and particularly, $10^{14}$ W/cm$^2$. Then multi-photon of the incident beam is absorbed non-linearly along an area where the solition is generated and diffracted in the optical waveguide material 30 to cause optical breakdown, thereby forming microplasma.

This microplasma formed leads to change in a grating structure of the optical waveguide material 30 and thus the area where the solition is generated and diffracted has a refractive index increased, for example, by 0.003 over a refractive index of a surrounding area. Accordingly this allows the optical waveguide 50 to be formed along the area where the solition is generated and diffracted as in S34.

According to the present embodiment, the aforesaid processes are repeated to easily form the plurality of optical waveguides 50 in the optical waveguide material 30. Also, the incident beam can be adjusted in intensity and size using the femto-second laser 10 and the lens 20 to uniformly form the optical waveguides 50 having various refractive indices and sizes As set forth above, according to exemplary embodiments of the invention, a soltion is generated in an optical waveguide and with the solition generated, an incident beam is increased in intensity to be made re-incident, thereby forming an optical waveguide. This allows a plurality of optical waveguides with uniform refractive indices to be formed easily.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing an optical waveguide, the method comprising:
    allowing a beam to be incident in an optical waveguide direction of the optical waveguide material;
    generating an optical soliton in the optical waveguide material by adjusting intensity of the incident beam according to the optical waveguide material;
    allowing the incident beam to be re-incident at an intensity higher than an intensity of the incident beam after checking generation of the optical soliton in the optical waveguide material; and
    increasing a refractive index of an optical soliton-generating area of the optical waveguide material by the re-incident beam to thereby form an optical waveguide.

2. The method of manufacturing an optical waveguide of claim 1, wherein the allowing a beam to be incident in an optical waveguide direction comprises:
    focusing the beam of a femto-second laser by a lens and allowing the beam to be incident in an optical waveguide direction of the optical waveguide material, the femto-second laser spaced apart from the optical waveguide material and the lens disposed between the optical waveguide material and the femto-second laser.

3. The method of manufacturing an optical waveguide of claim 1, wherein the optical waveguide material is a transmissive non-linear material.

4. The method of manufacturing an optical waveguide of claim 1, wherein the optical waveguide material is formed of a glass material selected from a group consisting of $LiNbO_3$, $LiTaO_3$, KTP, AlGaAs, ZnSe, $Al_2O_3$ and $SiO_2$.

5. The method of manufacturing an optical waveguide of claim 4, wherein the optical waveguide material is formed of the $SiO_2$ glass material and the incident beam for generating the optical soliton has an intensity of $10^{11}$ to $10^{12}$ $W/cm^2$.

6. The method of manufacturing an optical waveguide of claim 5, wherein the allowing the incident beam to be re-incident at an intensity higher than an intensity of the incident beam comprises allowing the incident beam to be re-incident at an intensity of $10^{13}$ to $10^{15}$ $W/cm^2$.

7. The method of manufacturing an optical waveguide of claim 1, wherein the generating optical soliton in the optical waveguide material comprises adjusting intensity of the incident beam according to non-linear characteristics of the optical waveguide material.

8. The method of manufacturing an optical waveguide of claim 1, wherein the allowing a beam to be incident in an optical waveguide direction, the generating an optical soliton in the optical waveguide material, the allowing the incident beam to be re-incident at an intensity higher than an intensity of the incident beam, and the increasing a refractive index of an optical soliton-generating area of the optical waveguide material by the re-incident beam are performed repeatedly,
    whereby the plurality of optical waveguides are formed in the optical waveguide material.

9. The method of manufacturing an optical waveguide of claim 1, wherein the increasing a refractive index of an optical soliton-generating area of the optical waveguide material comprises increasing the refractive index by changing a grating structure of the soution-generating area of the optical waveguide material by a microplasma formed when the re-incident beam is absorbed non-linearly.

* * * * *